(12) United States Patent
Bratvedt et al.

(10) Patent No.: US 7,164,990 B2
(45) Date of Patent: Jan. 16, 2007

(54) METHOD OF DETERMINING FLUID FLOW

(75) Inventors: Kyrre Bratvedt, Witney (GB); Paul Childs, Walnut Creek, CA (US); Martha Crane, Abingdon (GB); Frode Bratvedt, Asker (NO); Rudi Olufsen, Abingdon (GB)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 10/363,117

(22) PCT Filed: Aug. 30, 2001

(86) PCT No.: PCT/GB01/03872

§ 371 (c)(1),
(2), (4) Date: Jul. 30, 2003

(87) PCT Pub. No.: WO02/18747

PCT Pub. Date: Mar. 7, 2002

(65) Prior Publication Data

US 2004/0015295 A1 Jan. 22, 2004

(30) Foreign Application Priority Data

Aug. 30, 2000 (GB) .................................. 0021284.5

(51) Int. Cl.
*G01N 15/08* (2006.01)

(52) U.S. Cl. .............................. 702/12; 702/10; 702/13
(58) Field of Classification Search ............ 702/12–13; 703/10
See application file for complete search history.

(56) References Cited

OTHER PUBLICATIONS

Shtepani, F. B., et al., "New Laboratory Data Based Modeling of Miscible Displacement in Compositional Simulation", International Symposium of the Core Analysts, Aug. 2005.
Fanchi, John R., "Principals of Applied Reservoir Simulation", Third Edition, Elsevier, pp. 144-151.
Coats, K.H., et al., "Compositional and Black Oil Reservoir Simulation", SPE 29111, Feb. 12-15, 1995, pp. 149-162, San Antonio, TX.

*Primary Examiner*—John Barlow
*Assistant Examiner*—Stephen J. Cherry
(74) *Attorney, Agent, or Firm*—John H Bouchard; Danita J. M. Maseles

(57) ABSTRACT

A method of determining fluid flow in a volume containing two or more fluid components, including determining a pressure field for the volume. One or more streamlines are determined from the pressure field, and the fluid composition is solved for the fluid composition along the, or each, streamline. The pressure may also be solved along the, or each, streamline. The step of solving along the, or each, streamline may be performed using a finite difference technique.

22 Claims, 16 Drawing Sheets

Streamlines at 500 days
SPE9, Model 2.

CS: Compositional streamline
FD: Finite difference
Comparison of field oil production rates for the PUNQ model 1

PUNQ Model 1.

Saturation at 5000 days

PUNQ Model 1.
Saturation at 5000 days

PUNQ Model 2.
Streamlines at 5000 days

CPU time and memory usage for
the refine SPE 9 model
243,000 cells
1000 days simulation
IBM SP2, 1 CPU

|      | CS  | FD      |
|------|-----|---------|
| RAM: | 330 | 650 MB  |
| CPU: | 14  | 75 Hours |

SPE9 Model 2

METHOD OF DETERMINING FLUID FLOW

The present invention relates to a method of determining fluid flow, and to processing fluid flow data relating to a hydrocarbon reservoir. Typically, when a hydrocarbon reservoir is exploited one or more boreholes are drilled into the reservoir and liquid hydrocarbons such as oil and/or gas hydrocarbons is/are extracted from the reservoir through the boreholes (which are generally known as "producers"). A fluid, normally water, is introduced into the reservoir at one or more points distant from the producers, to displace liquid or gaseous hydrocarbons and cause them to be expelled from the reservoir through the producers. A point at which water is introduced into the reservoir is generally known as an "injector".

The extraction of liquid and/or gaseous hydrocarbons at the producer(s) and the injection of water at the injector set up a fluid flow pattern in the reservoir. The fluid flow pattern is also influenced by gravity. It is desirable to model the fluid flow within the reservoir, in order to predict, for example, how the yield of liquid and/or gaseous hydrocarbons extracted by a particular producer will vary over the planned lifetime of the exploitation of the reservoir (which can be many years). Furthermore a reservoir will generally contain a number of different hydrocarbon compounds, and it is desirable to model the yield of a particular hydrocarbon compound (generally referred to as a "component") at a producer as a function of time. Thus, it is preferable not just to calculate the overall hydrocarbon pressure at a producer, but also to calculate the hydrocarbon composition at a producer.

The mathematical equations governing fluid flow are known, so that a mathematical model of fluid flow in a given reservoir may be constructed. However such a mathematical model is generally not capable of being solved exactly, and it is necessary to use numerical techniques to determine an approximate solution. There are two principal classes of numerical techniques—streamline methods and finite difference techniques. Finite difference techniques have generally been used for simulation of fluid flow in a reservoir, although streamline methods have been used for numerical approximation of fluid flow since the 1800s and have been used in petroleum engineering since the 1950s.

Conventional finite difference techniques suffer from two principal drawbacks:—numerical smearing and loss of computational efficiency for models with a large number of grid cells. (In order to represent a multi-producer, geologically heterogeneous reservoir, a model having $10^5$ to $10^6$ cells is required.) Finite difference methods based on an IMPES (Implicit Pressure Explicit Saturation) approach are limited to using a short time step length owing to the limiting CFL condition, which limits the maximum distance that fluid can flow during a time step to less than the length of a grid cell. The need to use a short time step length increases the number of steps required in a simulation. As a result, the total processing time required to process a large model can make it impractical to apply the method.

An alternative approach is to use a fully implicit finite difference technique. This can, in principal, use a longer time step than an IMPES-based finite difference technique. However, it requires the inversion of a much larger matrix and this is a particular disadvantage with a simulation that incorporates the composition of fluid at a producer, since the existence of a large number of hydrocarbon components will make the matrix very large. Furthermore, the equations governing fluid flow are non-linear and this can place an upper limit on the allowable time step length. As a result, the processing time required for a fully implicit finite difference simulation may also make it impractical to apply the method to a large model, in particular to a compositional model. This problem has hitherto been addressed by using an adaptive implicit finite difference technique.

Conventional streamline techniques are based on an IMPES method. In these techniques the fluid pressure is solved implicitly, and streamlines are computed based on this solution for the fluid pressure. A streamline is the path that a particle would take through a three-dimensional space (in this case the reservoir) for a pressure solution at a given time. In this method, the three-dimensional domain of the reservoir is decomposed into many one-dimensional streamlines, and fluid flow calculations are performed each streamline. A streamline technique may have a high time step length, which reduces the processing time required. However, a conventional streamline technique assumes, despite the movement of fluid that occurs in the reservoir, that the pressure is constant over a time step of fluid movement and this assumption leads to a lack of connection between the pressure field and the movement of fluids. This can cause instabilities and limit the maximum time step length that can be used.

In an example of conventional streamline technique, the component conservation equations can be written in terms of moles as:

$$\frac{\partial}{\partial t}\left(\phi \sum_{j=g,w,o} x_{i,j} b_j S_j\right) + \overset{\rho}{\nabla} \cdot \sum_{j=o,w,g} x_{i,j} b_i \overset{\rho}{v}_j = q_i \qquad i=1,\ldots,n_c \qquad (1)$$

where $\phi$ is the porosity of the reservoir material, $x_{i,j}$ is the mole fraction of component i in the $j^{th}$ phase, $b_j$ is the molar density for phase j, $S_j$ is the saturation for phase j, and $q_i$ is the well production rate of component i. The saturation of a phase is the fraction of the total fluid volume for a given phase so, for example, if half the fluid at a given point is oil then the oil saturation is 0.5. The subscript i, where $1 \leq i \leq n_c$ denotes the particular hydrocarbon component, there are $n_c$ hydrocarbon components in total in the reservoir fluid, and j denotes the phase (gas, liquid etc). The velocity $v_j$ of the $j^{th}$ phase is defined as:

$$\overset{\rho}{v}_j = -\lambda_j\left(\overset{\mu}{\nabla} P_j - \rho_j \overset{\rho}{g}\right) \qquad (2)$$

where $\lambda_j$ is the mobility for phase j, $P_j$ is the pressure of the phase j, and $\rho_j$ is the mass density of phase j.

The streamline concept is based on an operator splitting technique for the conservation equations, which separates an equation for the pressure from the conservation equations. Assuming that capillary forces are negligible so that $P_c=0$, then a pressure equation may be written as $$-\overset{\rho}{\nabla} \cdot \overset{\rho}{v}_t + Q = \phi C_t \frac{\partial p}{\partial t} + \left(\sum_{j=o,w,g} \overset{\rho}{v}_j c_j\right) \cdot \nabla p \qquad (3)$$

where Q is the total well production rate which equals the total well injection rate, $v_t$ is the total velocity of fluid, $C_t$ is the fluid total compressibility; $c_j$ is the compressibility of phase j and p is the pressure.

Again assuming that the capillary pressure $P_c=0$ (in which case the $P_o=P_w=P_g$), then the total velocity is given by $$\vec{v}_t = -\lambda_t \vec{\nabla} P_o + \left(\sum_j \lambda_j \rho_j\right)\vec{g} \quad (4)$$

where $P_o$ is the oil phase pressure, $\lambda_t$ is the total mobility, $\lambda_j$ is the mobility of phase j, $\rho_j$ is the mass density of phase j and g is the acceleration due to gravity.

Equations (3) and (4) are used to find the pressure distribution for a given component distribution. The pressure equation is solved implicitly using a finite difference method to give a pressure field. From this pressure field, cell fluxes are found using equation (4). These fluxes define the streamlines. These conventional streamline calculations are well-known and are described in the literature.

Neglecting the gravitational term in the above equations, the IMPES-type assumption that the pressure is constant throughout a time step means that pressure-derivative terms can be ignored when solving for the saturation so that, for the concentration equation along a streamline, it is assumed that:

$$\vec{\nabla} \cdot \vec{v}_t = 0 \quad \frac{\partial \phi}{\partial t} = 0 \quad (5)$$

The total number of moles per unit volume of component i, $m_i$, is defined as $$m_i = \sum_{j=o,w,g} x_{i,j} b_j S_j \quad (6a)$$

and the convective flow of component i $F_i$ is defined as $$F_i = \sum_{j=o,w,g} f_j x_{i,j} b_j \quad (6b)$$

where $f_j$ is the fractional flow function of component j and $b_j$ is the molar density of phase j.

If the effect of gravity is neglected, then equation (1) may be re-written as a 1-D equation along the streamlines:

$$\frac{\partial m_i}{\partial t} + \frac{1}{\phi} \vec{v}_t \cdot \vec{\nabla} F_i = q_i \quad i=1,\ldots,n_c \quad (7)$$

where $q_i$ is the injection/production rate of the component i.

The velocity $v_t$ defines the streamlines. On the assumption that the pressure in the reservoir remains constant over a time step, then the streamlines will not change their path during a time step.

In order to account for the effect of gravity, we define the term for the flow due to gravity by $$\vec{G}_i = \sum_{j=o,w,g} x_{i,j} b_j \Gamma_j \vec{g}, \quad \Gamma_j = \lambda_j \rho_j - f_j \sum_{k=o,w,g} \lambda_k \rho_k \quad (8)$$

which arises from writing $v_j = v_t + \Gamma_j g$ for each phase j. In equation (8), $G_i$ is the flow due to gravity segregation for component i, $\Gamma_j$ is the gravity segregation strength for phase j and the index k denotes oil, water or gas (and is used since the usual index j is used earlier in the equation).

Equation (1) may now be re-written to separate the gravity flow term from the convective flow term, to give $$\frac{\partial m_i}{\partial t} + \frac{1}{\phi}\left(\vec{v}_t \cdot \vec{\nabla} F_i + \vec{\nabla} \cdot \vec{G}_i\right) = q_i \quad i=1,\ldots,n_c \quad (9)$$

In equation (9), the $\nabla \cdot F_i$ term is a 1-D term along the streamlines defined by $v_t$ and the $\nabla \cdot G_i$ term is a 1-D term along the gravity lines defined by the gravity vector g. It is possible to split the two terms, to give:

$$\frac{\partial m_i}{\partial t} + \frac{1}{\phi} \vec{v}_i \cdot \nabla F_i = q_i \quad (10)$$

$$\frac{\partial m_i}{\partial t} + \frac{1}{\phi} \vec{\nabla} \cdot \vec{G}_i = q_1 \quad (11)$$

Equation (10) models the convective flow in the absence of gravity, and may be solved as described above. Equation (11) models the gravity segregation of the fluids. The gravity vector in equation (8) is constant and known, so that the gravity lines are always defined. The full 3-D movement of fluids in the reservoir is modelled by solving equations (10) and (11) sequentially. FIG. 1 illustrates schematically how the saturation is modelled initially along a streamline, and then along a gravity line.

The principal steps of a conventional streamline method are shown in FIG. 2. At step 1 a fluid flow model of the reservoir is initialised, and at step 2 an initial estimate of the pressure field in the reservoir is made by solving implicitly for the pressure. At step 3 the initial streamlines are calculated from the initial estimate of the pressure field. The saturation is then mapped onto these initial streamlines at step 4, and the saturation is solved over a time step $\Delta T$ along the streamlines at step 5, using equation (10). Several techniques for this are known.

The saturation is them mapped from the streamlines onto the gravity lines, at step 6, and the saturation is solved over the time step $\Delta T$ along the gravity lines at step 7, using equation (11). The saturation is then mapped onto grid cells at step 8, so that the saturation at each grid point within the reservoir can be output.

To repeat the calculations over a subsequent time step, the time is updated at step 9, and the pressure field within the reservoir is re-computed from the newly-calculated values for the saturation. Step 3 of estimating the streamlines from the pressure is then repeated. A suitable counter is updated at step 10, and the newly-calculated values for the saturation are then mapped onto the new streamlines. Steps 5 to 8 of computing the saturation along the (new) streamlines, mapping the saturation onto the gravity lines, computing the saturation along the gravity lines and mapping the saturation onto the grid cells are then repeated. Steps 9, 10 and 2–8 may then be repeated until the fluid flow has been simulated over a desired time period.

One advantage of a streamline technique is that the problem of simulating the fluid flow in the reservoir has been reduced to a set of separate, smaller 1-D problems. As noted above, however, conventional streamline techniques assume that the pressure field is constant over a time step (which means that the streamlines are fixed over a time step). This assumption limits the length of the time step that can be used, since effects that depend on pressure changes are ignored. This problem is particularly serious if the pressure within the reservoir is changing rapidly since, in this case, large errors may occur unless the time steps are be kept short.

A first aspect of the present invention provides a method of determining fluid flow in a volume containing two or more fluid components, the method comprising: determining a pressure field for the volume; determining one or more streamlines from the pressure field; and solving for the fluid composition along the or each streamline.

A second aspect of the invention provides a method of processing data relating to a hydrocarbon reservoir containing two or more fluid components, the method comprising the steps of: determining a pressure field for a volume indicative of the reservoir; determining one or more streamlines from the pressure field; and solving for the fluid composition of the reservoir along the or each streamline.

The present invention thus makes it possible to perform a full compositional calculation along a streamline.

In a preferred embodiment the method further comprises solving for the pressure along the or each streamline.

The step of solving the fluid composition along the or each streamline and, optionally, the step of solving the pressure along the or each streamline may be repeated by updating the pressure field, re-computing the streamlines for the updated pressure field, and solving along the re-computed streamlines. This enables the fluid composition, and optionally the pressure, to be modelled as a function of time.

Where the invention is applied to a hydrocarbon reservoir, it provides information about the expected yield at a producer of the reservoir. This may be used to control the production of the reservoir, for example to determine where to locate a producer and/or an injector.

In preferred embodiment, the step of solving along the or each streamline comprises using a finite difference technique. This eliminates the requirement of a conventional streamline technique that the pressure is assumed to the constant during a time step. In turn, this allows a longer time step length, and so reduces the number of steps required to simulate over a given time period.

A third aspect of the present invention provides an apparatus for determining fluid flow in a volume containing two or more fluid components, the apparatus comprising: means for determining a pressure field for the volume; means for determining one or more streamlines from the pressure field; and means for solving for the fluid composition along the or each streamline.

A fourth aspect of the present invention provides an apparatus for processing data relating to a hydrocarbon reservoir containing two or more fluid components, the apparatus comprising: means for determining a pressure field for a volume indicative of the reservoir; means for determining one or more streamlines from the pressure field; and means for solving for the fluid composition of the reservoir along the or each streamline.

In a preferred embodiment, the apparatus comprised a programmable data processor.

A fifth aspect of the present invention provides a storage medium containing a program for a data processor of an apparatus as defined above.

Preferred embodiments of the present invention will now be described by way of illustrative example with reference to the accompanying Figures, in which:

FIG. 3(*b*) is a flow chart illustrating one embodiment of the invention;

In a streamline calculation of the present invention, the pressure field for a reservoir is calculated at for each time step, and the streamlines are estimated from this pressure field as in the prior art. However, the one-dimensional solutions along the streamlines are found a fully implicit technique or an adaptive implicit technique. The pressure and the fluid composition are solved for together along each streamline. Physical effects that depend on the changes in pressure can be taken account of in the solution along the streamlines, and it is not necessary to assume that the pressure remains constant over a time step. The present invention is thus able to use long time steps, even if the pressure is changing rapidly, and this reduces the number of steps required in a simulation.

The invention may be applied to a "black oil" calculation or to a composition calculation, but a streamline-based approach to solving a "black oil" calculation is described in a publication, SPE 51904, entitled "A Streamline Based Approach to Solution of Three-Phase Flow", by L. Ingebrigtsen, et al, Feb. 14, 1999, published more than one year before the priority date of this application. In a "black oil" calculation, only water, oil and gas are considered, and the individual hydrocarbon components are not considered, as they are in a full fluid composition calculation.

In one embodiment, a method of the invention is carried out using a Streamline Simulator (CS) and a finite difference simulator (FD). The finite difference simulator is used to provide the fully implicit solutions along the streamlines. One suitable finite difference simulator is the Schlumberger GeoQuest Eclipse 300 simulator, which is a commercial reservoir simulator. A suitable Streamline Simulator is the Schlumberger GeoQuest FrontSim simulator.

Figure 1:
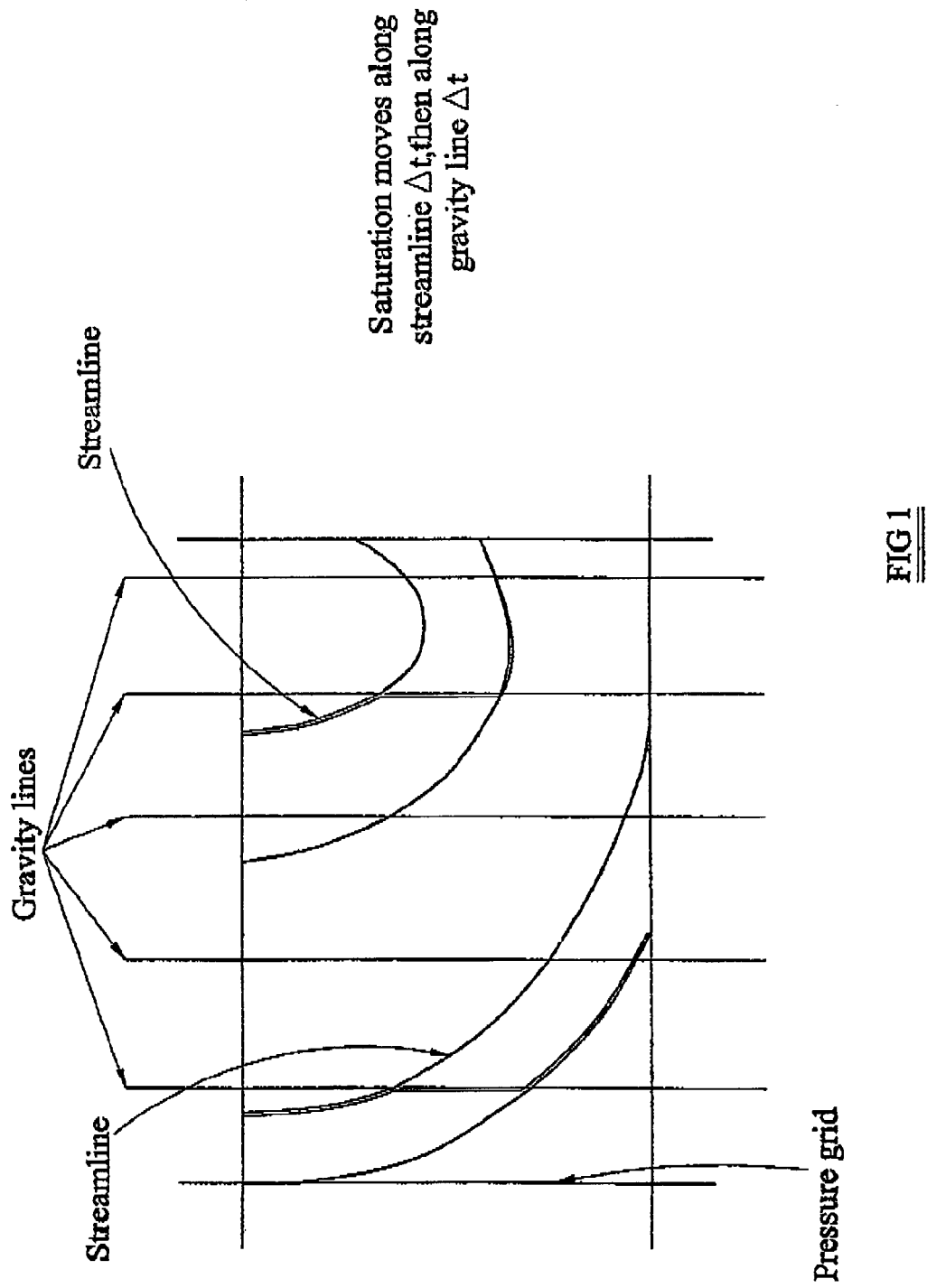
FIG. 1 is a schematic illustration of a conventional streamline technique.
Figure 2:
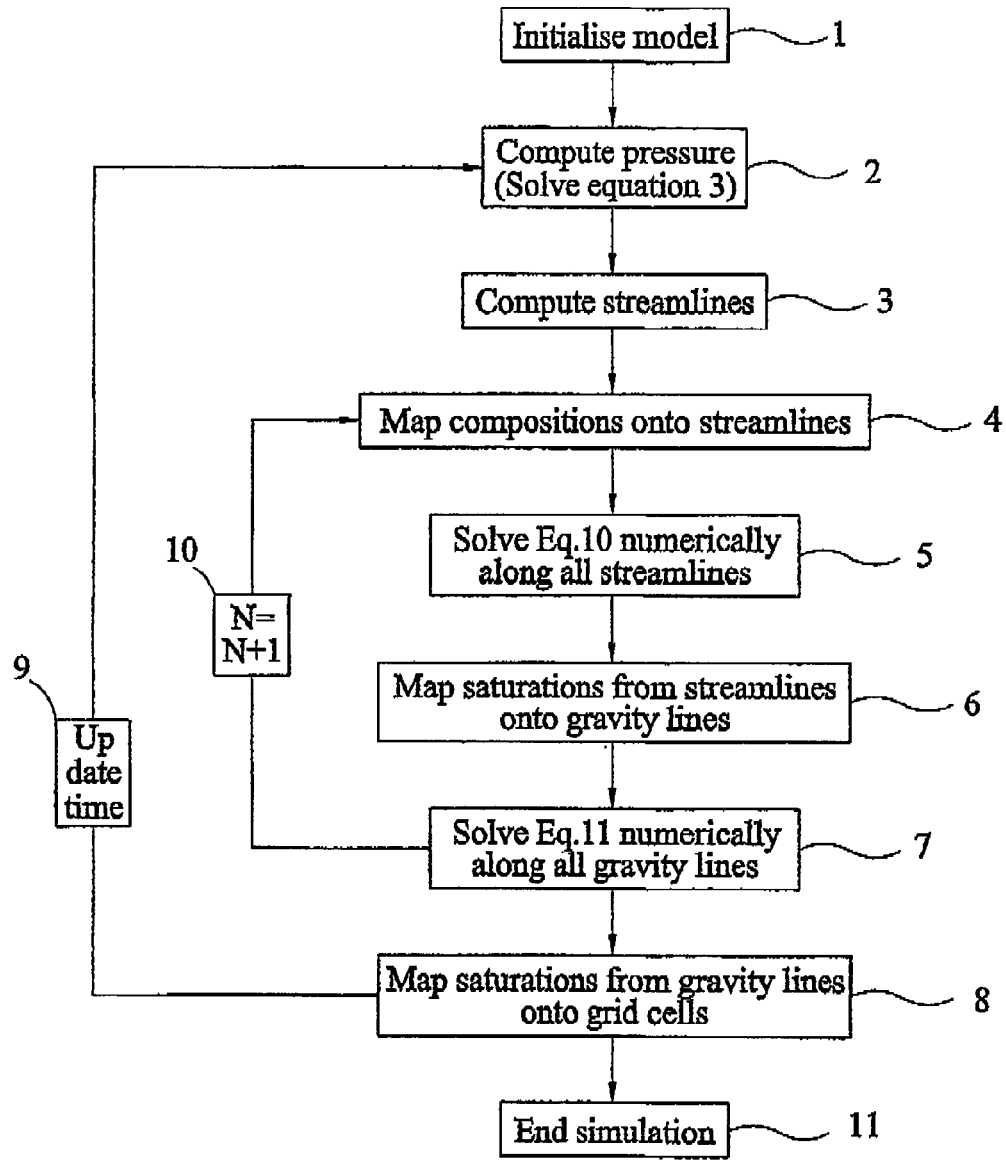
FIG. 2 is a flow chart for a conventional streamline technique.
Figure 3A:
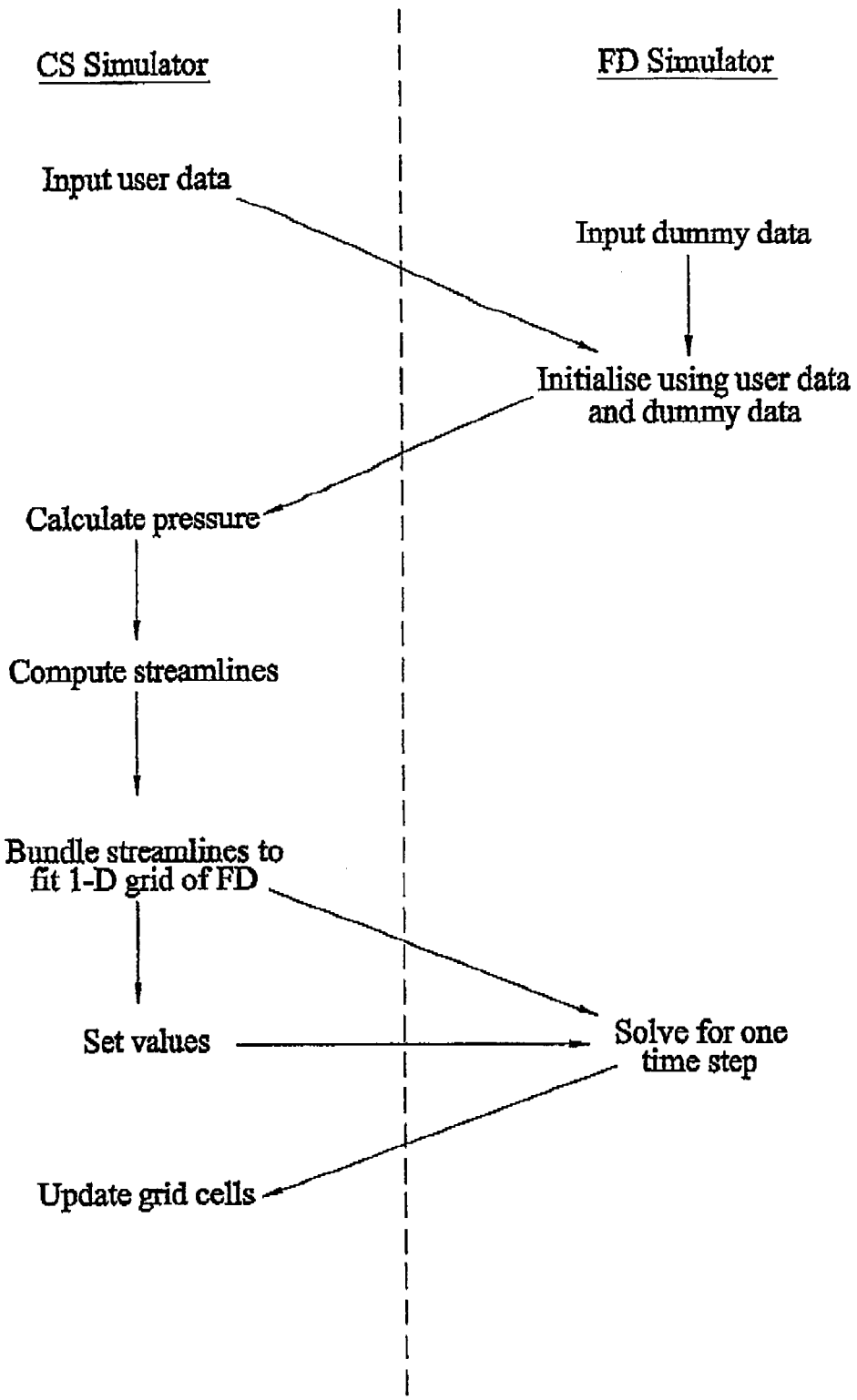
FIG. 3(*a*) is a flow chart illustrating the principal steps of a method of the invention.

FIG. 3(a) is a flow diagram setting out the principal steps of a method of the present invention. The method will be described with reference to a hydrocarbon reservoir but, in principle, the invention may be performed on any volume that contains two or more fluid components.

Initially the CS simulator is initialised by loading user-defined data such as the pressure P, the water saturation $S_w$, and the mole fractions $m_t$ of the various hydrocarbon components. Alternatively, if the gas saturation $S_g$ and the mole fractions $x_{i,j}$ of the j phases of the i components are available, these can be loaded into the CS simulator. The CS simulator contains a global grid of cells that are used in the calculations.

The FD simulator is then initialised for 1-D simulations using the fluid and component properties and relative permeability from the user data, and dummy data for the grid parameters and scheduling data. These dummy values are updated for each streamline during the simulation.

The CS simulator then instructs the FD simulator to calculate the initial gas saturation, the initial pressure field, and the initial phase compositions for each compositional model. These calculations are done in the flash calculation module of the FD simulator.

The FD simulator also calculates pressure derivatives.

The pressure field for a volume that defines the reservoir is then calculated by the solver of the CS simulator. This is done using an IMPES-type solver, which has been modified to calculate the partial pressure field for each component of the reservoir fluid. The pressure-dependent variables needed by the Jacobian are supplied by the flash module of the FD simulator The streamlines are then computed from the pressure field.

Figure 4:
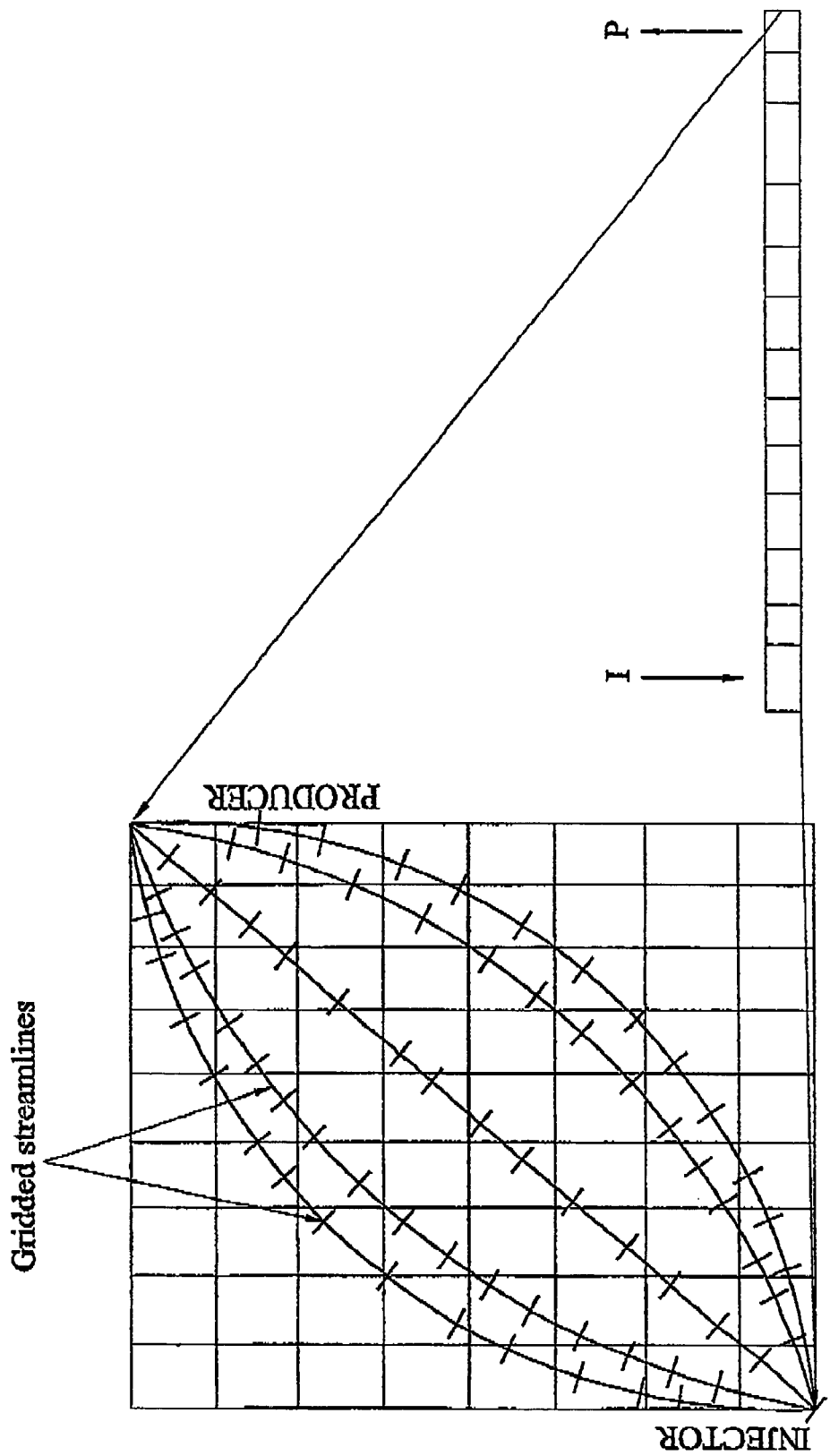
FIG. 4 is a schematic illustration of one step of a method according to the present invention.

The data that the FD simulator need to simulate one time step is then prepared. The FD simulator has a fixed 1-D grid, and the streamlines are bundled up so that they fit into the fixed grid, as shown schematically in FIG. 4. The left hand of FIG. 4 is intended to represent streamline that extend from an injector to a producer as they would appear in the CS simulator (streamlines are generally three-dimensional, but are shown as two-dimensional in FIG. 4 for convenience). In order to solve along the streamline in the FD simulator, the streamline is mapped onto a one-dimensional grid, as shown on the right of FIG. 4.

The initial values for the FD simulator, such as the transmissibility and depth of the grid, and the pressure, saturation and composition of the fluids, are set by the CS simulator. The pressure is computed both globally for each time step and locally along each streamline when the fluids are moved. [The positions of the producer(s) and injector(s) are also defined.

The FD simulator then solves the pressure equation for one global time step for its fixed 1-D grid which, as explained above, represents a set of streamlines. The FD simulator then passes the results of this simulation to the CS simulator so that the values of the solution variables, the molar densities, the pressure and the saturations for the global grid cells can be updated. During this update, volumetric averages of the values calculated on the streamlines are mapped back to the global grid in the CS simulator.

Figure 3B:
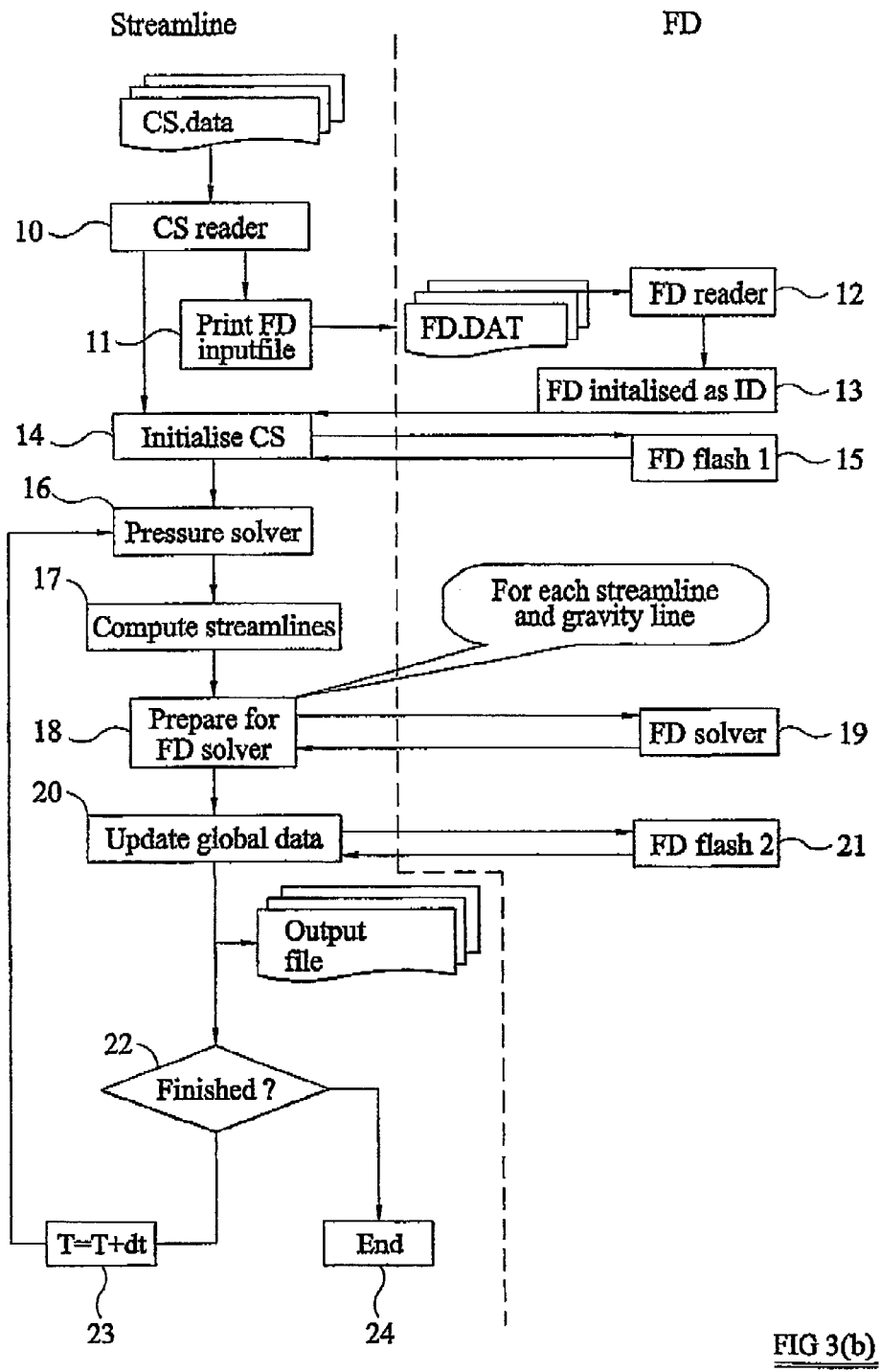

FIG. 3(b) is a more detailed flow diagram showing one embodiment of the invention.

First, the simulation is initialised. This initialisation includes initialising two separate simulators, the CS simulator and the FD simulator.

At step 10 user input data is read by the CS simulator. At step 11 the CS simulator prepares data to be input to the FD simulator, and at step 12 this data is read into the FD simulator.

At step 13 the FD simulator is initialised for 1D simulations, typically a small 1D grid. The size of the FD simulator grid does not depend on the size of the CS simulator grid since the FD simulator is used to solve for grids representing streamlines only. The fluid and component properties as well as the relative permeability tables are initialised for the FD simulator using data input by the user into the CS simulator and passed to the FD simulator by the CS simulator. The rest of the input data to the FD simulator (grid parameters, wells and production schedule) is a set of dummy values for the initialisation. During the simulation these variables will be dynamically updated for each streamline.

The CS simulator is then initialised at step 14. The initial gas saturation, pressure and phase compositions for the CS simulator are computed using the FD simulator flash calculation module at step 15, and are supplied to the CS simulator. The FD simulator flash module also supplies the CS simulator with data for the phase mobility, density, and compressibility as well as the derivatives of these quantities with respect to pressure.

Next the CS simulator computes the pressure field within the reservoir at step 16. The pressure solver in the CS simulator is an IMPES type solver and few modifications have been made for the compositional case. The pressure dependent variables needed for the matrix are supplied by the FD flash module. From the pressure field the fluxes are determined and streamlines are computed at step 17. The streamlines may be computed in any suitable manner, for example using the method described above.

In order to use the FD simulator to solve for the compositions and pressure, the streamlines are broken down into 1D grids defined by transmissibility, pore volume and depths for the grid cells. This is done in the CS simulator, as step 18. The gravity lines are also broken down into 1D grids, again at step 18.

Each of these 1D grids can be solved individually by the FD simulator. For performance reasons, the CS simulator will fill the FD grid with a set of streamline grids. An injector is positioned in the first cell and a producer in the last cell of each part of the grid representing a single streamline, as shown schematically in FIG. 4.

At step 19, the FD simulator solves one time step for the set of streamlines in the FD grid. The results of this step are sent to the CS simulator. The resulting compositions and pressure determined at step 19 are mapped onto the CS grid at step 20. This procedure is repeated until all streamlines have been solved.

Once all streamlines have been solved and mapped onto the CS simulator grid, the FD simulator performs, at step 21, a flash calculation on the resulting averages in the CS simulator grid. As for the initial flash calculation at step 15, the FD simulator flash will supply the CS simulator with values for the phase mobility, density and compressibility as well as the derivatives of these quantities. However, the values calculated at step 21 are updated values, at the end of a time step. These values may be output for review by an operator, if this is desired.

At step 22 there is a determination whether the simulation is complete. If the result of this determination is "no", a time counter is incremented at step 23, and the pressure is then re-calculated at step 16. The pressure is recalculated from the updated values computed by the FD simulator at step 21.

Steps 16 to 23 are then repeated until the simulation is complete and a "yes" determination is obtained at step 22, whereupon the process ends at step 24. The detailed mathematical basis for the present invention will now be described.

The gravity lines are handled very much in the same way as the streamlines. They are mapped to the FD simulator, and results are obtained in the same way as for the streamlines. The main difference is that there are no wells defined in the gravity lines since only the gravity segregation of the fluids need be taken into account. The initial condition for the gravity lines are the results of the streamline simulator.

From equation (1), the component conservation equations for each component i in the FD simulator can be written in terms of $n_c+2$ primary solution variables for pressure and component molar densities X=(p, mi, mw), where i=1 ... $n_c$, and mw is the molar density of water.

$$\frac{\partial}{\partial t} m_i + \nabla \cdot \left( \sum_{j \ne g,w,o} x_{i,j} \lambda_j [\nabla p_j - \rho_j g] \right) + q_i = 0 \quad (12)$$

for i=1 ... $n_c$, where j denotes the phase and $\lambda_j$ is the mobility of the $j^{th}$ phase, $$\lambda_j = \frac{k_{rj} b_j}{\mu_j}$$

(with $k_{rj}$ the relative permeability of phase j). A similar equation can be written for water.

The finite volume discretisation for component and water molar conservation equations then lead to $n_c+1$ equations of the form $$\frac{((V_p m_t)^{n+1} - (V_p m_t)^n)}{\Delta t} + \sum_j F_{i,j} + q_i = 0 \quad (13)$$

In streamline mode, the 1D spatial discretisation in equation (13) is in time of flight (TOF) along the streamlines. If the total number of hydrocarbon moles per unit pore volume is $$m_t = \sum_{i=1}^{n_c} m_1$$

then the phase saturations for oil, water and gas, $S_w$, $S_w$, $S_g$, are defined in terms of the liquid and vapour mole fractions L, V and the phase molar densities of oil, water and gas, $b_w$, $b_o$, $b_g$, as $$S_w = m_w/b_w, \quad S_o = Lm_t/b_o, \quad S_g = Vm_t/b_g \quad (14)$$

where $m_t$ is the total hydrocarbon molar density, and so the phase volume per unit pore volume is given by $$u_T = \frac{m_w}{b_w} + \frac{Lm_t}{b_o} + \frac{Vm_t}{b_g} \quad (15)$$

The FD simulator solves the additional volume balance constraint $V_p=V_f=V_p u_T$, where $V_p$ is the pore volume, $V_f$ is the fluid volume, and $u_T$ is the phase volume per unit pore volume, and total compressibility of the fluid is given by $$C_t = -\frac{1}{u_T} \frac{du_T}{dP} \quad (16)$$

This is used to construct the pressure equation (3). The FD simulator flash package also supplies values and derivatives for other extensive properties in equation (3) such as $\mu_j$, the viscosity of phase j, and $\rho_j$.

The CS simulation is initialised by calling the compositional equilibrator, and is flashed onto the global grid. The initial data consists of the pressure P, the saturation of water $S_w$ and mole fractions $z_i$, or both $S_w$ and the gas saturation $S_g$ and mole fractions $x_{i,j}$ if available. Since the simulator works with specific molar density primary variables $m_i$ it is important to predict $m_i$ in order to preserve material balance when the solution is interpolated back and forth between the global grids and streamlines. After solving a simulator time step, the solutions are then pulled back onto the global grid and reflashed before computing the new streamlines. Material balance errors and the and the work involved in this reflash is minimised by initialising the FD streamline solver and global flash with saturations $S_o$, $S_g$ and $S_w$ and liquid and vapour compositions $x_{i,o}$ and $x_{i,g}$, so the vapour fraction $V=S_g b_g/m_i$ is predicted. The initial molar phase densities are computed as $b_j=b_j(x_{i,j},P)$ and $b_w=b_w(P)$ so that the component molar densities are given by $$m_i = x_{i,o} S_o b_o + x_{i,g} S_g b_g \quad (17)$$

The interpolation of saturations $S_j$ and mole fractions $x_{i,j}$ between the streamline and global grids attempts to conserve the molar masses $x_{i,j} S_j b_j$ of components in each phase as well as the molar mass of water $m_w$ while pressures are pore volume weighted averages. The material balance errors are then minimal and uT should be approximately 1. If uT is significantly different from 1, the predicted $S_o$, $S_w$, $S_g$ in equation (15) obtained from the FD simulator flash package are normalised by uT, leading to material balance error in the streamline simulation.

The compositional simulator runs efficiently since the streamlines are one-dimensional. Streamlines are concatenated into a 1-D list and presented to the simulator as a bundle so that key parts of the FD can readily be optimised for a 1-D solution. Each streamline in the bundle may be converged separately; the convergence criteria in the simulator are based on achieving tolerances on solution changes in p and mi.

In the examples described in detail above, the streamlines have been solved fully implicitly. Alternatively, the streamlines may be solved using adaptive implicit method (AIM) solutions along streamlines.

Examples illustrating the improvement provided by the invention will now be described.

1. SPE9 Simple Model

The 9th SPE Comparison Problem, as presented by J. Killough at the 13th Symposium of Reservoir Simulation, San Antonio, Tex. (1995) was converted from black oil to a compositional problem. The problem relates to heterogeneous reservoir with a single water injector and 24 oil producers whose operation was converted to reservoir volume control. In the simulation a 9000 cell grid (24×25×15) is used. The producers are completed (open) in the layers 2,3,4, and the injector was completed in layers 11 to 15. The reservoir is initialised with an oil water contact in the reservoir. The simulation is run for a period of 900 days. The PVT data for 6 components, having from one to 20 carbon atoms (C1–C20), is used with single stage flash to standard conditions of 60° F. and 14.7 psi.

Figure 5:
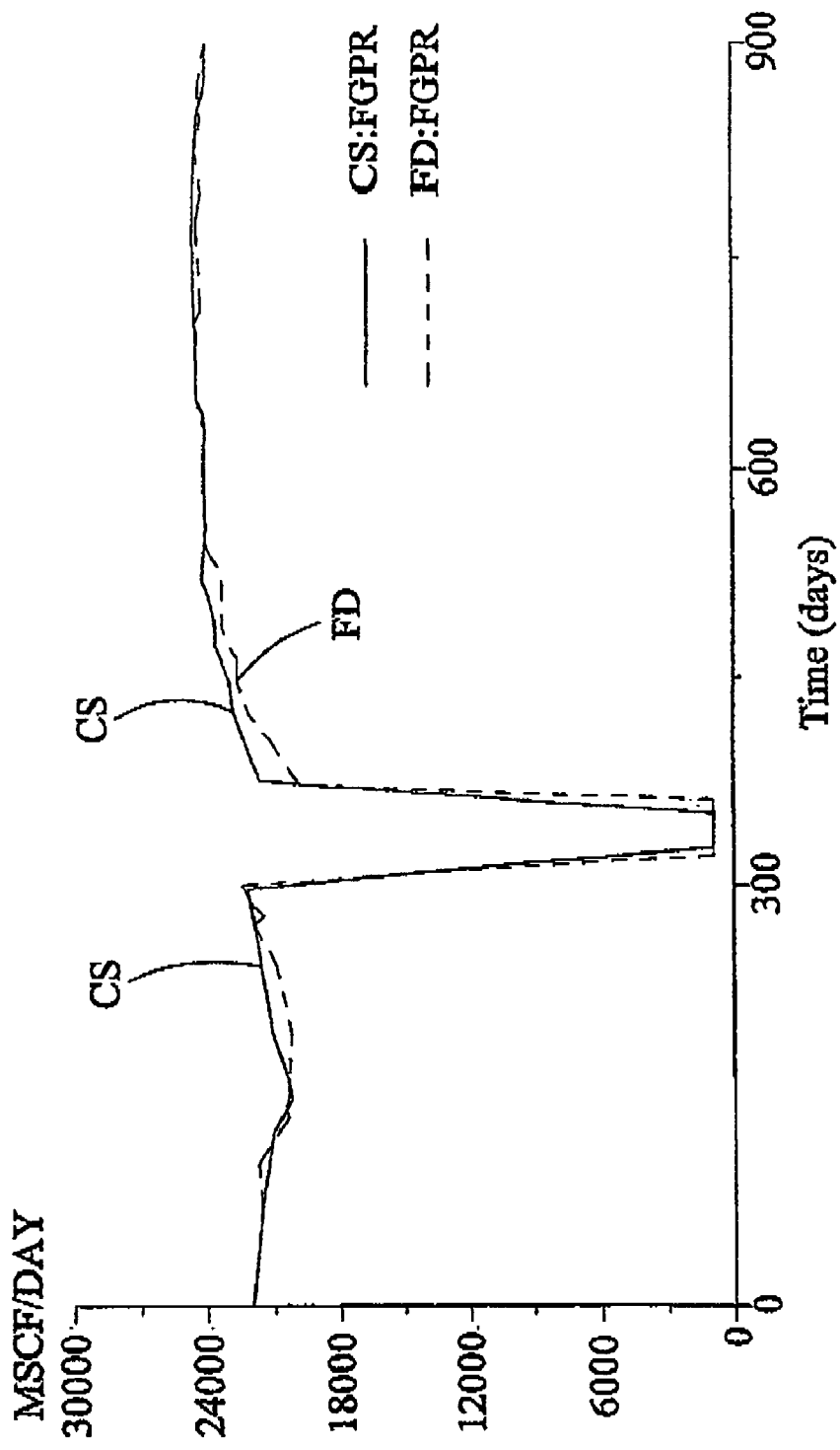
FIG. 5 illustrates gas production rates predicted by a method of the invention and a conventional technique for a first reservoir model.

FIG. 5 shows the field gas production rate (FGPR) as simulated using a CS model of the present invention and an FD model for comparison. It will be seen that the material balance error predicted by the CS method of the invention is less than 0.6%.

2. SPE Refined Model

Figure 6:
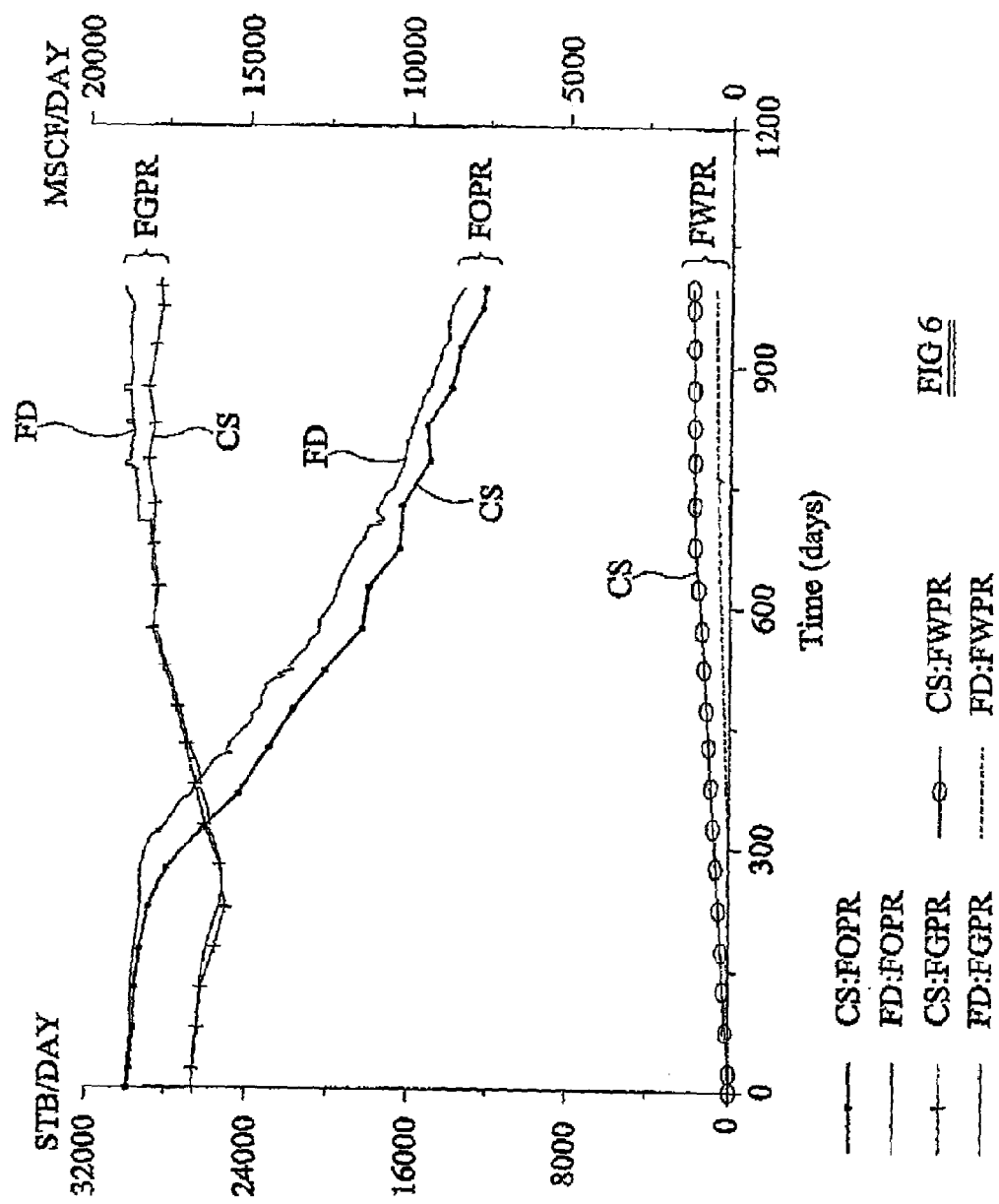
FIG. 6 illustrates oil, gas and water production rates predicted by a method of the invention and a conventional technique for a second reservoir model.

The SPE9 comparison model was refined to a 72×75×45 grid with the same 6 component PVT data as for the SPE simple model described above to give a 243,000 cell model. For models of this size, the streamline approach may be much faster than a finite difference simulation. A simplified production schedule was employed with the production wells under a constant reservoir volume control of 1500 Stb/day and the water injector maintaining a bottom hole pressure (BHP) of 4500 psi over a period of 1000 days. The producers were completed (open) in layers 4 to 12). FIG. 6 compares field oil production rates (FOPR), field gas production rates (FGPR) and field water production rates (FWPR) for a CS simulation and an FD simulation. It can be seen that the oil recovery predicted by the CS simulation is slightly lower than the oil recovery predicted by the FD simulation.

Figure 13:
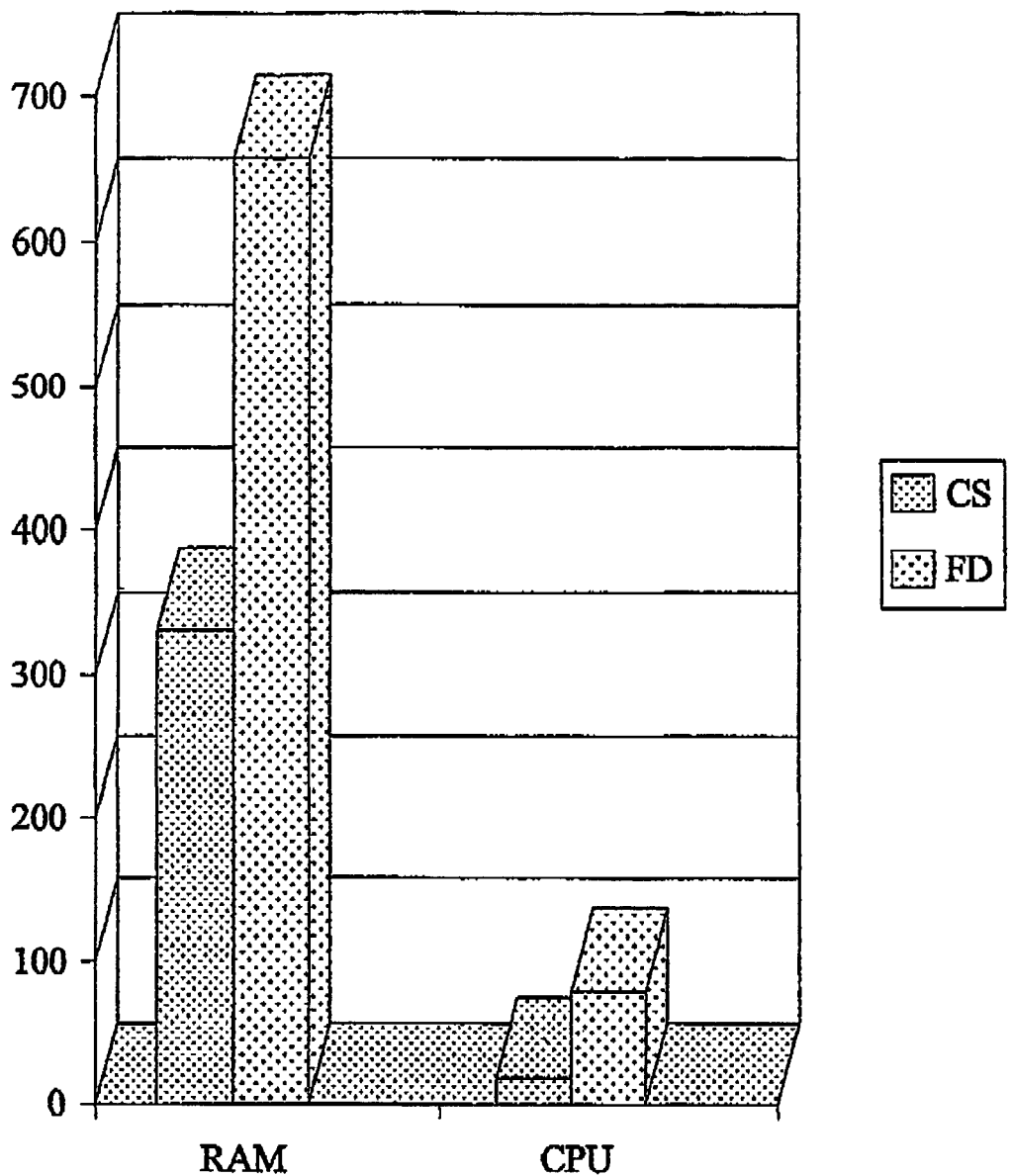
FIG. 13 is a comparison of the CPU time and RAM capacity required by a method of the invention and a conventional technique.

FIG. 13 shows the memory capacity and CPU time required to perform a simulation for this model, using a CS simulation of the invention and using a conventional FD simulation. The CS simulation used a 243,000 cell model, and extended over a simulation period of 1,000 days. This Figures shows that a CS simulation of the invention is quicker and needs less memory that a conventional FD simulation. The CS simulation required 14 hours of CPU time (on an IBM SP2) and 330 MB RAM, whereas the conventional FD simulation required 75 hours CPU time and 650 MB RAM. Thus, even with no tuning, a CS simulation of the present invention runs in less than a fifth of the CPU time required for an FD simulation, and needs approximately half the memory capacity.

Figure 7:
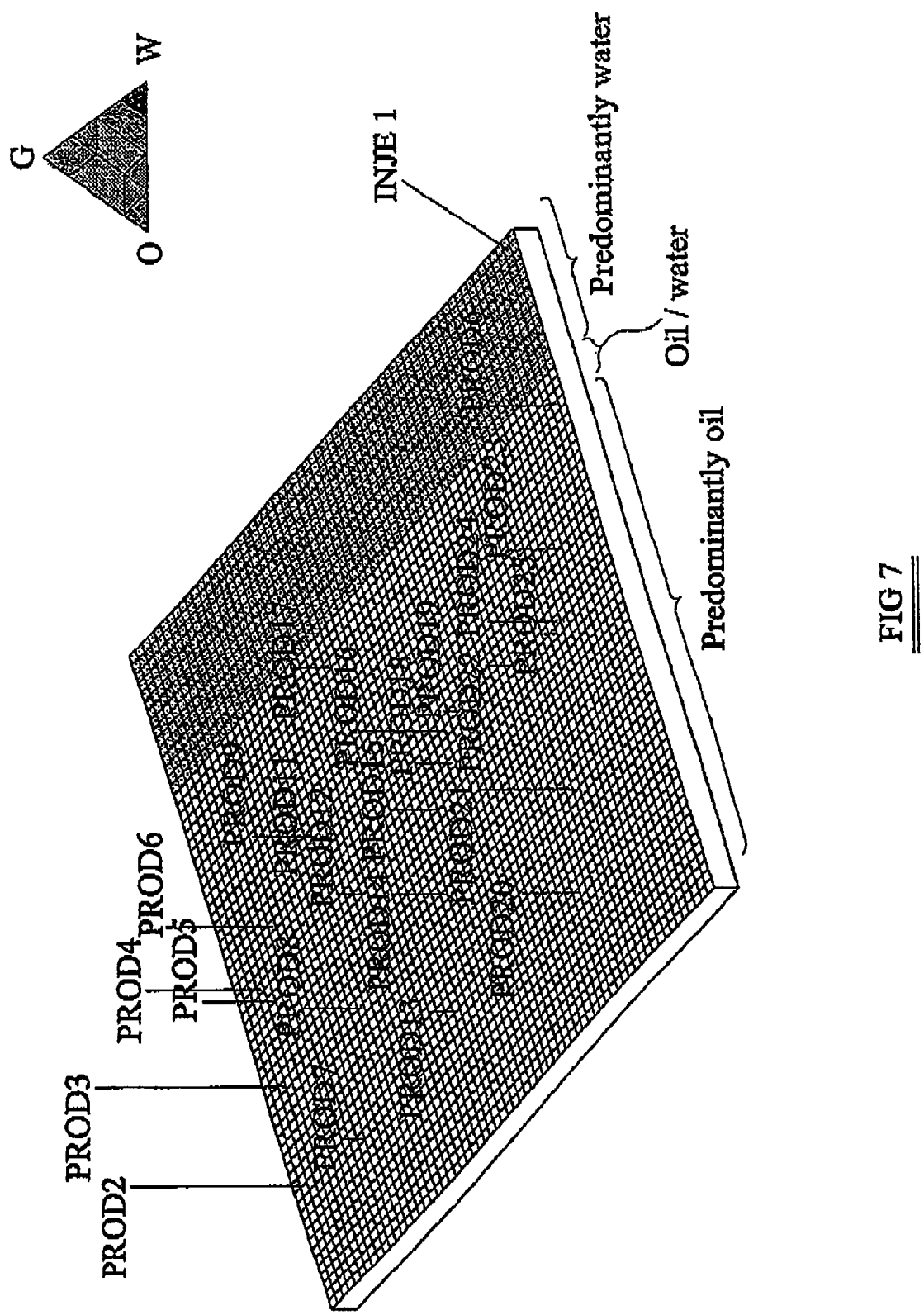
FIG. 7 shows a saturation plot for a method of the invention for the second reservoir model.
Figure 8:
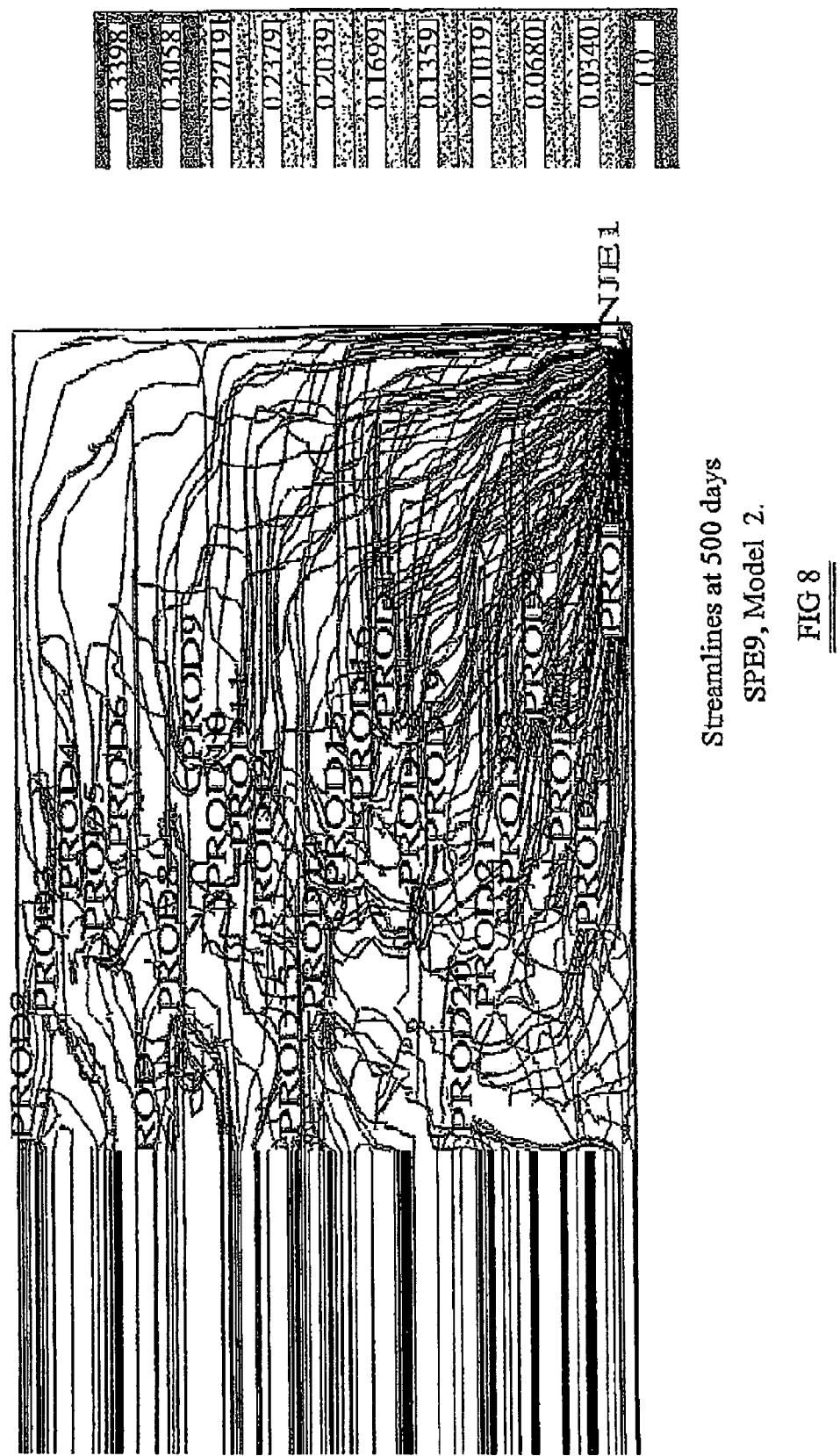
FIG. 8 shows a streamline plot for a method of the invention for the second reservoir model.

FIGS. 7 and 8 illustrate the saturation (FIG. 7) and the streamlines (FIG. 8) for the top layer of the reservoir simulation for the SPE 9 refined model after 500 days. In FIG. 7 the saturation is shaded to denote oil, gas or water. As indicated in the Figure, a region near the injector extending across the entire breadth of the top layer of the reservoir (that is, into the paper), and over approximately 0.2 of the width of the top layer of the reservoir (that is, across the paper) contains predominantly water, The remainder of the top layer of the reservoir contains predominantly oil, except for a narrow region at the boundary of the water-containing region.

The streamlines in FIG. 8 are shaded to indicate gas saturation. whereas the is where the streamlines are shaded to indicate gas saturation. The gas saturation is close to zero near the injector, and increases away from the injector, generally to around 0.1 although it reaches o.2 or 0.3 in some regions. The material balance error is 0.03% for the CS simulation.

3. The PUNQ Simple Model

Figure 9:
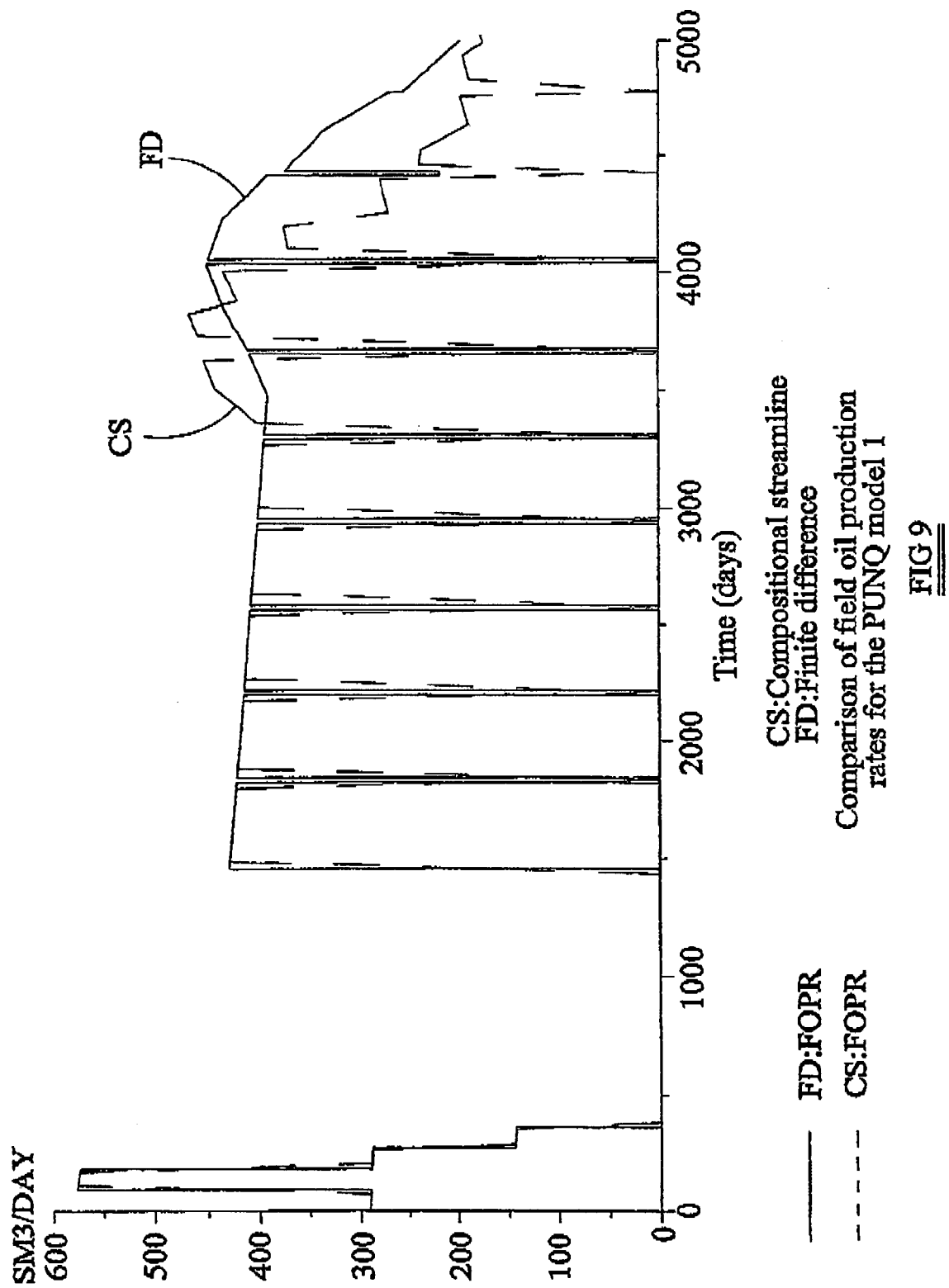
FIG. 9 illustrates oil production rates predicted by a method of the invention and a conventional technique for a third reservoir model

The PUNQ-Simple model of F. J. T Floris et al, European Conference on the Mathematics of Oil Recovery (1998) was converted to a 5-component compositional model and initialised with an oil water contact in the reservoir. The coarse simulation model has 1761 active cells and the rim aquifer was removed for the purpose of comparing the finite volume simulation and the streamline simulation. The reservoir is depleting with the wells put under reservoir volume rate controls for a 5000 day period from January 1967. The well separator conditions assume a single stage flash to standard conditions. FIG. 9 shows the field oil production rates (FOPR) predicted by a conventional FD simulation and by a CS simulation of the invention. It can be seen that CS simulation predicts an early decline in production when the BHP constraint is achieved. (Initially in the simulation the produces are controlled to have a constant rate, and a limit for the maximum bottom hole (BHP) is set. The BHP increases during the simulation, and will eventually reach the set limit. At this point the target for the well is changed to maintain a constant BHP, and the production rate decreases.

Figure 10:
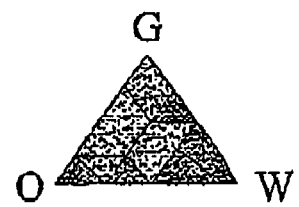
FIG. 10 shows a saturation plot for a method of the invention for a third reservoir model.
Figure 10:
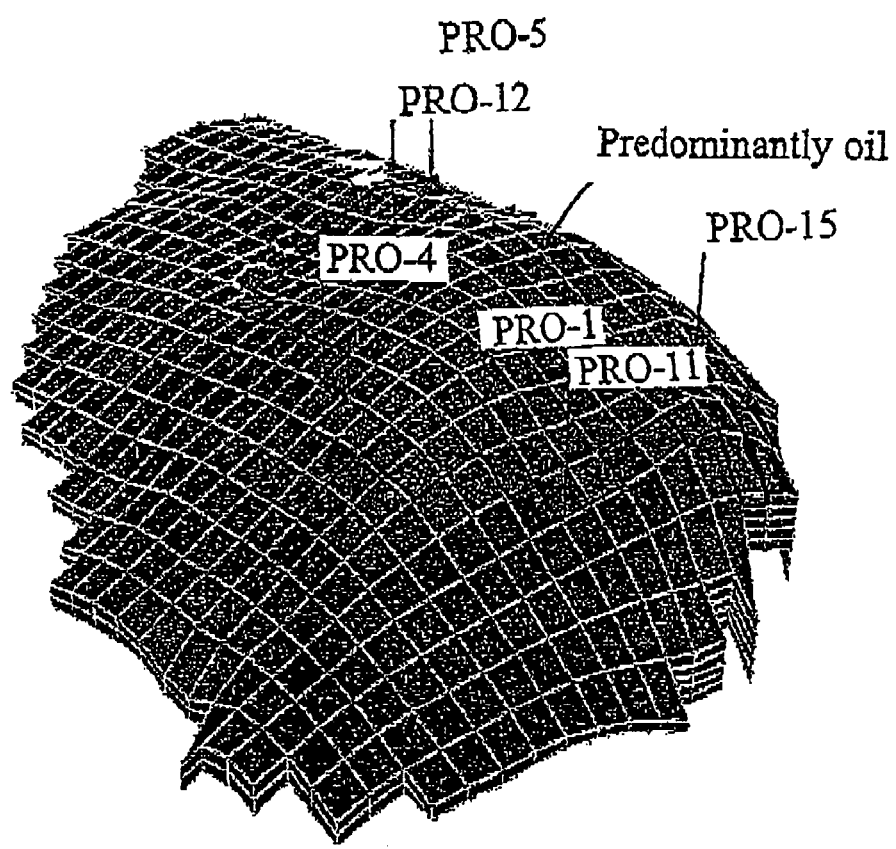
Figure 11:
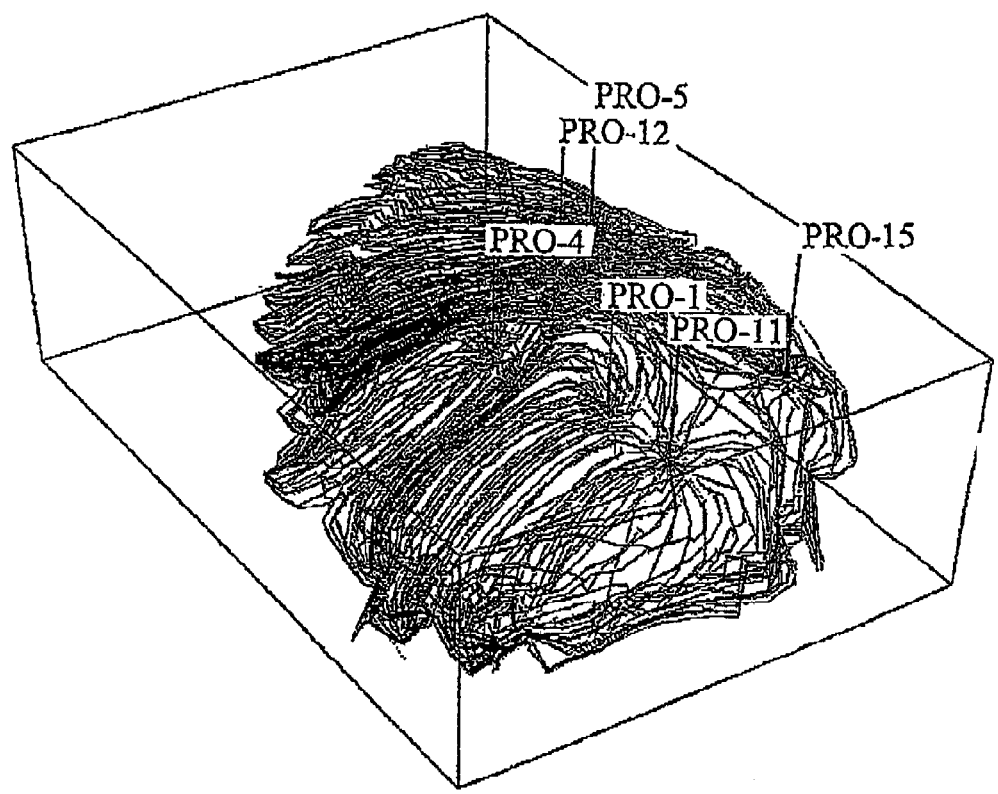
FIG. 11 shows a streamline plot for a method of the invention for the third reservoir model.

FIGS. 10 and 11 show the saturation plot (FIG. 10) and the streamline plot (FIG. 11) for the CS model after 5000 days when free gas has appeared in the reservoir. The indicated region in the saturation plot of FIG. 10 contains predominantly oil, and elsewhere there as an oil/water mix (with the water content generally increasing away from the predominantly-oil region. The gas saturation in FIG. 11 was approximately 0.2 in a region that corresponds generally to the predominantly-oil region of FIG. 10, although it reached 0.25–0.3 near producers Pro 1, Pro 4 and Pro 5. Elsewhere, the gas saturation was lower, generally in the range 0.05 to 0.15.

4. PUNQ Complex Model

Figure 12:
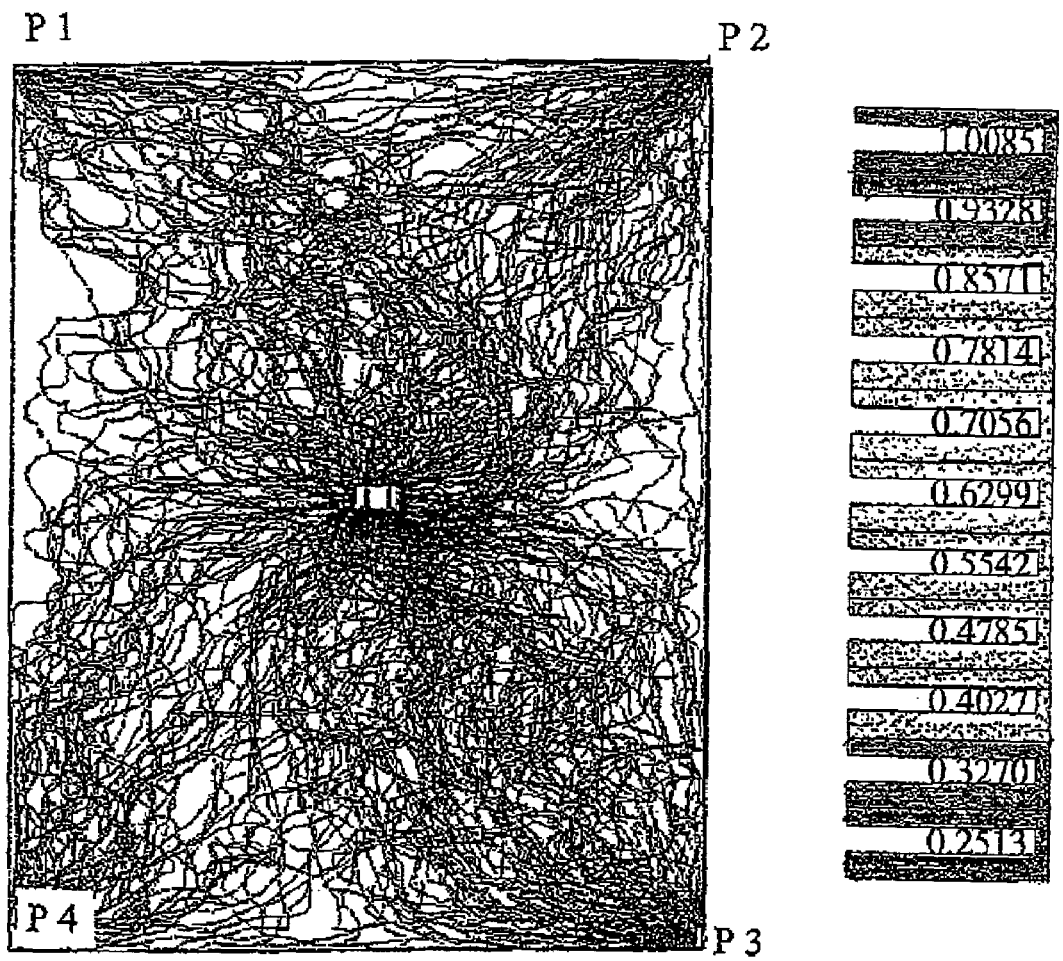
FIG. 12 shows a streamline plot for a method of the invention for a fourth reservoir model.

As an illustration of an application of the invention to a geological scale model that it is impractical to solve using a conventional simulation without first upscaling, the million cell PUNQ complex model (the SPE $10^{th}$ comparative solution project on upscaling) was run. In this model the wells are arranged in a 5 spot pattern. A central injector injects water at a reservoir volume rate of 4000 Stb/day and four producers operate under bottom hole pressure constraints of 4000 psi. The reservoir is located between 12,000 and 12,170 feet and is initialised with a datum pressure of 6000 psi at 1200 feet with an OWC at 2000 feet. The six component fluid described in Example 1 is used. FIG. 12 illustrates the streamlines after 5110 days. The streamlines are shaded to indicate the C10 molar density, and it can be seen that this increases from approximately 0.25 at the centre of the layer to approximately 1 at each of the producers P1 to P4

The invention has been described above with reference to separate CS and FD simulators. In practice however, the invention may conveniently be carried out by embodying the CS simulator and the FD simulator in a single program that is run on any suitable processor.

Figure 14:
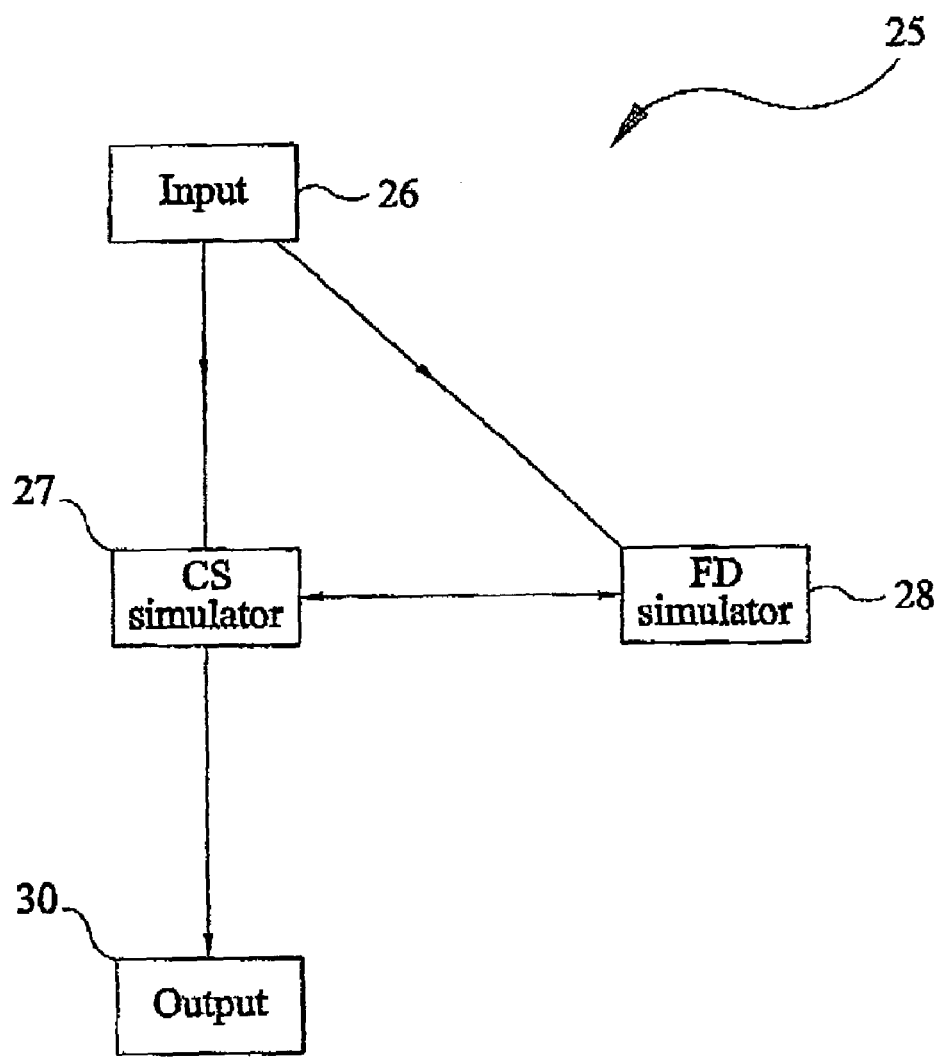
FIG. 14 is a block schematic diagram of an apparatus constituting a further embodiment of the invention.

FIG. 14 is a schematic block diagram of an apparatus 25 according to the present invention. The apparatus comprises an input device 26 for receiving input data to be processed and for supplying to the remainder of the apparatus data t the appropriate time for processing.

The apparatus further comprises a streamline simulator 27 and an FD simulator 28. The FD simulator may be a fully-implicit FD simulator, or it may be an adaptive implicit FD simulator.

Finally the apparatus comprises an output device 29, such as a printer, a visual display unit, or a memory.

Figure 15:
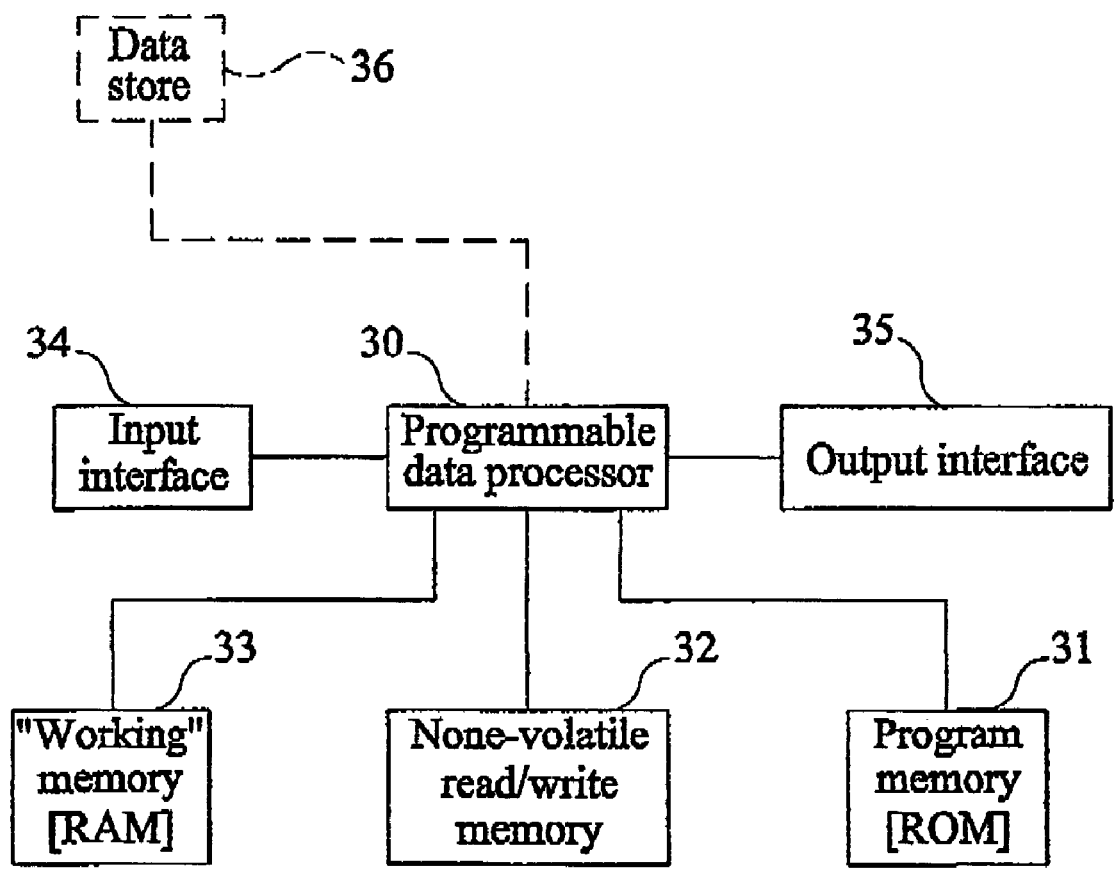
FIG. 15 is a block schematic diagram of a programmable data processor-based apparatus constituting a further embodiment of the invention.
Figure 15:
Figure 15:
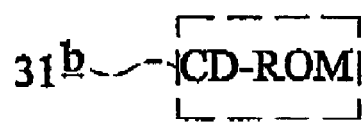

FIG. 15 illustrates a programmable system embodying the apparatus of FIG. 14, for performing a method according to the present invention, such as the method illustrated in FIG. 3(a) or FIG. 3(b). The system comprises a programmable data processor 30 with a program memory 31, for instance in the form of a read only memory ROM, storing a program for controlling the data processor 30 to perform, for example, the method illustrated in FIG. 3(a) or FIG. 3(b). The system further comprises non-volatile read/write memory 32 for storing, for example, any data which must be retained in the absence of power supply. A "working" or "scratchpad" memory for the data processor is provided by a random access memory (RAM) 33. An input interface 34 is provided, for instance for receiving commands and data. An output interface 35 is provided, for instance for displaying information relating to the progress and result of the method. User-define data may be supplied via the input interface 34 or may optionally be provided by a machine-readable store 36.

The program for operating the system and for performing the method described hereinbefore is stored in the program memory 31, which may be embodied as a semi-conductor memory, for instance of the well-known ROM type. However, the program may be stored in any other suitable storage medium, such as magnetic data carrier 31a (such as a "floppy disc") or CD-ROM 31b.

We claim:

1. A method of determining fluid flow in a volume containing three or more hydrocarbon components, the method comprising:
    determining a pressure field for the volume;
    gridding the volume;
    determining one or more streamlines from the pressure field;
    bundling the, or each, streamline into a one dimensional grid; and
    solving for, and storing, a full fluid composition along the, or each, streamline.

2. A method as claimed in claim 1 and further comprising solving for the pressure along the, or each, streamline.

3. A method as claimed in claim 2 further comprising the steps of:
    determining an updated pressure field for the volume;
    determining one or more streamlines from the updated pressure field; and
    solving for a full fluid composition of the reservoir along the, or each, streamline determined from the updated pressure field.

4. A method as claimed in claim 3 wherein the step of solving along the, or each, streamline comprises using a finite difference technique.

5. A method as claimed in claim 3 wherein the step of solving along the, or each, streamline comprises using a fully implicit finite difference technique.

6. A method as claimed in claim 3 wherein the step of solving along the, or each, streamline comprises using an adaptive finite difference technique.

7. A method as claimed in claim 2 further comprising the steps of:
    determining an updated pressure field for the volume;
    determining one or more streamlines from the updated pressure field; and solving for a full fluid composition and pressure along the, or each, streamline determined from the updated pressure field.

8. A method of processing data relating to a hydrocarbon reservoir containing three or more hydrocarbon components, the method comprising the steps of:
    determining a pressure field for a volume indicative of the reservoir;
    gridding the volume;
    determining one or more streamlines from the pressure field;
    bundling the, or each, streamline into a one dimensional grid; and
    solving for, and storing, a full fluid composition of the reservoir along the, or each, streamline.

9. A method as claimed in 8 further comprising solving for the pressure of the reservoir along the, or each, streamline.

10. A method as claimed in claim 9 further comprising the steps of:
    determining an updated pressure field for the volume indicative of the reservoir;
    determining one or more streamlines from the updated pressure field; and solving for the fluid composition of the reservoir or for the fluid composition and the pressure along the or each streamline determined from the updated pressure field.

11. A method of processing data relating to a hydrocarbon reservoir containing two or more hydrocarbon components, the method comprising the steps of:
    determining a pressure field for a volume indicative of the reservoir; determining one or more streamlines from the pressure field; and solving for the fluid composition of the reservoir using compositional simulation, along the, or each, streamline;
    solving for the pressure of the reservoir along the, or each, streamline;
    determining an updated pressure field for the volume indicative of the reservoir;
    determining one or more streamlines from the updated pressure field;
    solving for the fluid composition of the reservoir or for the fluid composition and the pressure along the, or each, streamline determined from the updated pressure field; and
    further comprising the further step of controlling production of the reservoir on the basis of the results of the step of solving along the, or each, streamline.

12. A method as claimed in claim 11 wherein the step of solving along the, or each, streamline comprises using a finite difference technique.

13. A method as claimed in claim 11 wherein the step of solving along the, or each, streamline comprises using a fully implicit finite difference technique.

14. A method as claimed in claim 11 wherein the step of solving along the, or each, streamline comprises using an adaptive finite difference technique.

15. An apparatus for determining fluid flow in a volume containing three or more hydrocarbon components, the apparatus comprising:
    means for determining a pressure field for the volume;

means for gridding the volume;
means for determining one or more streamlines from the pressure field;
means for bundling the, or each, streamline into a one dimensional grid; and
means for solving for a full fluid composition along the or each streamline.

16. An apparatus for processing data relating to a hydrocarbon reservoir containing three or more hydrocarbon components, the apparatus comprising:
means for determining a pressure field for a volume indicative of the reservoir;
means for gridding the volume;
means for determining one or more streamlines from the pressure field;
means for bundling the, or each, streamline into a one dimensional grid; and
means for solving for a full fluid composition of the reservoir along the, or each, streamline.

17. An apparatus as claimed in claim 16 wherein the means for solving the fluid composition along the, or each, streamline is a finite difference simulator.

18. An apparatus as claimed in claim 17 wherein the finite difference simulator is further adapted to solve for the pressure along the, or each, streamline.

19. An apparatus as claimed in claim 18 wherein the finite difference simulator is a fully implicit finite difference simulator.

20. An apparatus as claimed in claim 18 wherein the finite difference simulator is an adaptive implicit finite difference simulator.

21. An apparatus as claimed in claim 20 wherein the means for determining the pressure field is a streamline solver.

22. An apparatus as claimed in claim 21 comprising a programmable data processor.

* * * * *